(12) United States Patent
He et al.

(10) Patent No.: US 6,571,224 B1
(45) Date of Patent: May 27, 2003

(54) FUZZY LOGIC BASED COLOR TRANSITION IMPROVEMENT METHOD AND SYSTEM

(75) Inventors: Lei He, Fremont, CA (US); Hong Min Zhang, Santa Clara, CA (US)

(73) Assignee: NDSP Corporation, Campbell, CA (US)

( * ) Notice: Subject to any disclaimer, the term of this patent is extended or adjusted under 35 U.S.C. 154(b) by 176 days.

(21) Appl. No.: 09/695,496

(22) Filed: Oct. 24, 2000

(51) Int. Cl.[7] .............................. G06F 15/18; G06G 7/00
(52) U.S. Cl. ................................. 706/8; 706/1; 706/900
(58) Field of Search ................................. 706/8, 1, 900

(56) References Cited

U.S. PATENT DOCUMENTS

| | | |
|---|---|---|
| 4,758,891 A | 7/1988 | James et al. |
| 4,935,806 A | 6/1990 | Khosro |
| 5,305,424 A | 4/1994 | Xiwen et al. |
| 5,920,357 A | 7/1999 | Kazuhiro |
| 6,330,038 B1 * | 12/2001 | Johnson .................. 348/625 |

OTHER PUBLICATIONS

Pernull, Hurbert and Draxelmayr, Dieter A Digital Display Processor with Integrated 9 bit Triple DAC for Enhanced TV Applications, IEEE Transactions on Consumer Electronics, vol. 39, No. 3, Aug., 1993.

* cited by examiner

*Primary Examiner*—John Follansbee
*Assistant Examiner*—Joseph P. Hirl
(74) *Attorney, Agent, or Firm*—Marger Johnson & McCollom, P.C.

(57) ABSTRACT

A fuzzy logic based digital color transition improvement method and apparatus for increasing color sharpness by replacing the slow transition color edges with edges that have steeper rising and falling times. Fuzzy logic used here to decide where the transition happens and how to enhance the signal when transition happens. Based on the results of fuzzy logic inference, through weighting among input digital color signal, its N-pixel delayed signal and 2N-pixel delayed signal, the output signal has steep and smooth color edges without ringing.

33 Claims, 5 Drawing Sheets

Figure 4

| 1ST DIFFERENCE SIGNAL OF 1ST ORDER \ DIFFERENCE SIGNAL OF 2ND ORDER | NL | NS | PS | PL |
|---|---|---|---|---|
| PL | LARGE 411 | LARGE 412 | SMALL 413 | SMALL 414 |
| PS | LARGE 421 | MEDIUM 422 | MEDIUM 423 | SMALL 424 |
| NS | SMALL 431 | MEDIUM 432 | MEDIUM 433 | LARGE 434 |
| NL | SMALL 441 | SMALL 442 | LARGE 443 | LARGE 444 |

400

FUZZY LOGIC BASED COLOR TRANSITION IMPROVEMENT METHOD AND SYSTEM

FIELD OF THE INVENTION

The invention relates to digital color transition improvement (DCTI), particularly to a DCTI method and system using fuzzy logic. (As understood herein, DCTI is also known as digital color transient improvement, which is a term used interchangeably with digital color transition improvement.)

BACKGROUND

Color video signals such as NTSC, PAL or SECAM types all have luminance (luma) component and chrominance (chroma) component. Specifically, the chroma signal bandwidth is usually narrower than luma signal bandwidth. As such, color edges changes occur much slower than luma edges changes. In other words, a chroma signal transition occurs fairly slower than a luma signal transition. Consequently, chroma signal edges/transitions usually appear degraded, thereby needing enhancement to "sharpen" the chroma signal transitions.

Numerous prior art approaches exist for enhancing the slow transition color edges with edges that have steeper rising and falling times. One prior art approach generates an enhanced chroma signal transition by introducing to a chrominance signal an additional signal limited to a certain range. Yet another prior art approach generates an enhanced chroma signal transition by switching among a chrominance signal, and its delayed input signals. However, both prior art approaches in turn introduce additional problems.

Specifically, in the first prior art approach, adding a signal such as a difference signal of second order can lead to a fast chroma transition. Unfortunately, this fast chroma transition is generated with undesirable overshoot and undershoot that need to be "cleaned away" by additional circuits. Also, introducing additional signals may increase noise to signal ratio. On the other hand, in the prior art second approach, an additional low pass filter is needed to smooth out input signal to avoid wrong switching choice. Also, a threshold level needs to be established before switching takes place. As such, this threshold level cannot be flexibly adjusted to a different threshold level that leads to a better enhanced chroma transition. Also, at certain threshold levels, the process of performing DCTI becomes sensitive and vulnerable to noise.

Thus, a need exists for performing DCTI without introducing signal overshooting or undershooting that need to be cleaned away with additional circuits. Also, a need exists for performing DCTI without increasing noise to signal ratio. A further need exists for performing DCTI without being restricted by threshold levels. Moreover, a need exists for performing DCTI without being sensitive to noise.

SUMMARY

The invention provides digital color transition improvement (DCTI) without introducing signal overshooting or undershooting that need to be cleaned away with additional circuits. Also, the invention provides DCTI without increasing noise to signal ratio. The invention further provides DCTI without relying on any signal threshold level. Moreover, the invention provides DCTI without being sensitive to noise.

Preferably, a method is performed for digital color transition improvement (DCTI) on a N-pixel delayed signal of a digital chrominance signal. The method involves the digital chrominance signal, the N-pixel delayed signal and a 2N-pixel delayed signal of the digital chrominance signal. Using these three signals, a first and a second difference signals of first order are generated. Specifically, the first difference signal of first order is generated from the difference between the digital chrominance signal and the N-pixel delayed signal; the second difference signal of first order is generated from the difference between the N-pixel delayed signal and the 2N-pixel delayed signal. Furthermore, using the first and second difference signals of first order, a difference signal of second order is generated. In turn, the method and system generate a weighted sum of the digital chrominance signal and the 2N-pixel delayed signal. Specifically, the weighted sum is characterized by a weighing factor determined by applying a set of fuzzy inference rules to the first difference signal of first order and the difference signal of second order. The implementation of these fuzzy inference rules is performed by a fuzzy inference algorithm.

In addition, the method and system refine the weighted sum by generating a new (second) weighted sum of the N-pixel delayed signal and the weighted sum. Specifically, the new weighted sum is characterized by a new (second) weighing factor determined by applying a new (second) set of fuzzy inference rules to the first and second difference signal of the first order. In turn, the method and system generate a new weighted sum that has an enhanced digital color transition in comparison to the N-pixel delayed signal. Thus, the new weighted sum becomes the result of performing DCTI on the N-pixel delayed signal.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings which are incorporated in and form a part of this specification, illustrate embodiments of the invention and together with the description, serve to explain the principles of the invention:

FIG. 4 is a table showing a set of fuzzy logic inference rules as implemented in accordance with one embodiment of the invention.

DETAILED DESCRIPTION

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
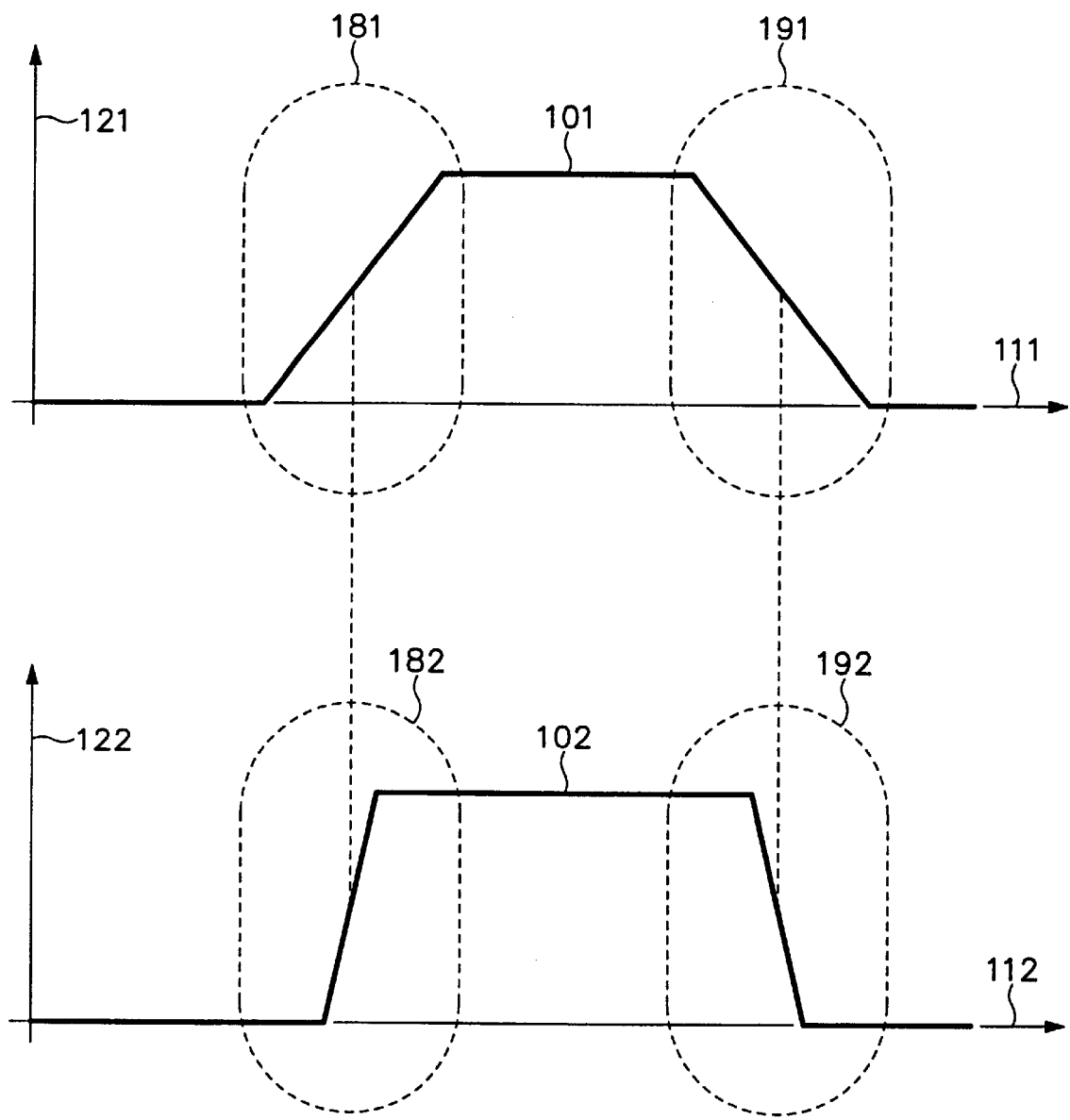
FIG. 1 shows signals involved in digital color transition improvement (DCTI) in accordance with one embodiment of the invention.

Referring now to FIG. 1, a chrominance signal transition 181 and its intended enhanced transition 182 (through DCTI) are shown. In addition, a chrominance signal transition 191 and its intended enhanced transition 192 (through DCTI) are shown. Specifically, chrominance signal transitions 181 and 191 are depicted as a part of the profile of an input digital chrominance signal 101. The horizontal axis 111 is used to indicate pixel locations. The vertical axis 121 is used to indicate pixel chrominance values. Similarly, chrominance signal transitions 182 and 192 are depicted as a part of the profile of an output digital chrominance signal 102. The horizontal axis 112 is used to indicate pixel locations. The vertical axis 122 is used to indicate pixel chrominance values. As will be explained, chrominance signal transition 181 will be made into intended enhanced transition 182 by a DCTI system and method in accordance with embodiments of the invention. Also, chrominance signal transition 191 will be made into intended enhanced transition 192 by the DCTI system and method in accordance with embodiments of the invention.

Figure 2:
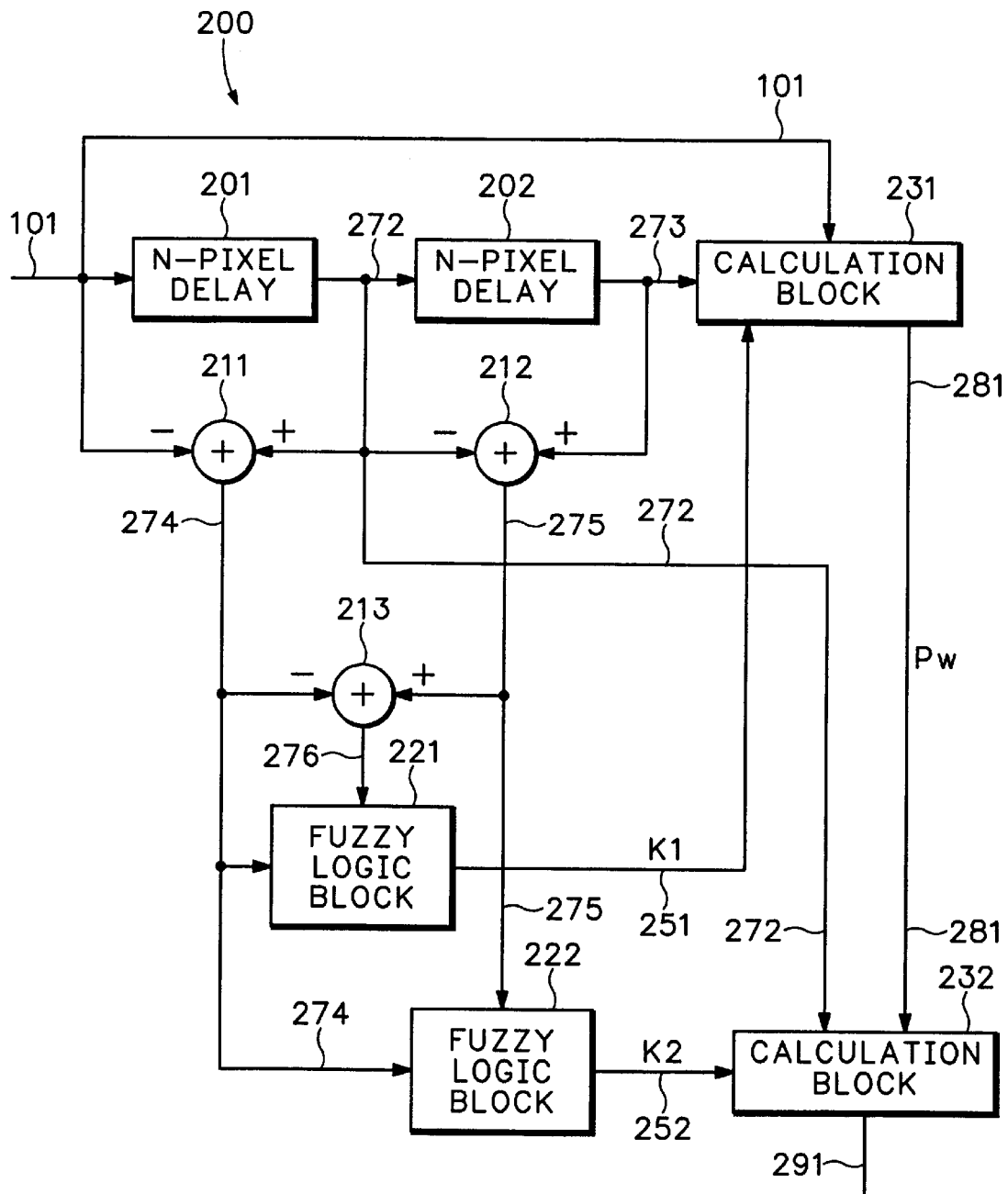
FIG. 2 shows a DCTI system in accordance with one embodiment of the invention.

Referring now to FIG. 2, a digital system 200 for performing DCTI is shown in accordance with one embodiment of the invention. First, digital system 200 will be described in terms of its physical components. Next, digital system 200 will be described in terms of functions performed by these components on digital chrominance signals.

Continuing with FIG. 2, digital system 200 comprises two N-pixel delays 201–202, three summing blocks 211–213, two fuzzy logic blocks 221–222, and two calculation blocks 231–232.

Still referring to FIG. 2, input digital chrominance signal 101 serves as an input signal to N-pixel delay component 201 and generate therefrom a N-pixel delayed signal 272, which serves as an input signal to N-pixel delay component 202 and generate therefrom a 2N-pixel delayed signal 273. Summing component 211 takes in both digital chrominance signal 101 and N-pixel delayed signal 272 and generates therefrom an output signal that is a first difference signal of first order 274. On the other hand, summing component 212 takes in N-pixel delayed signal 272 and 2N-pixel delayed signal 273 and generates therefrom an output signal that is a second difference signal of first order 275. Summing component 213 takes both first difference signal of first order 274 and second difference signal of first order 275 and generates therefrom an output that is a difference signal of second order 276.

Still referring to FIG. 2, fuzzy logic block 221 takes in first difference signal of first order 274 and difference signal of second order 276, then generates therefrom a weighing factor K1 251 as an input to calculation block 231. In addition to K1 251, calculation block 231 also receives inputs that include chrominance signal 101, 2N-pixel delayed signal 273, then generates therefrom a signal Pw 281 as an input to calculation block 232. Also for calculation block 232, fuzzy logic block 222 takes in both first and second difference signals of first order 274–275, then generates therefrom a weighing factor K2 252 as an input to calculation block 232. Moreover, calculation block 232 receives N-pixel delayed signal 272 as an additional input. Having received inputs that include Pw 281, K2 252 and N-pixel delayed signal 272, calculation block 232 generates an output digital chrominance signal Pout 291. In contrast to input digital chrominance signal 101, output digital chrominance signal Pout 291 has sharper color transitions.

Specifically, fuzzy logic block 221 performs a fuzzy inference algorithm to generate a fuzzy set D1 in accordance with a set of fuzzy inference rules. (This set of fuzzy logic inference rules will be described with reference to FIG. 4.) Then as a part of the fuzzy inference algorithm, fuzzy logic block 221 "defuzzifies" the generated fuzzy set D1 by pinpointing a particular member of the generated fuzzy set D1. The value of the pinpointed member is the value of weighing factor K1 251. Similarly, fuzzy logic block 222 performs a fuzzy inference algorithm to generate a fuzzy set D2 in accordance with a new set of fuzzy inference rules. (This set of fuzzy logic inference rules will be described with reference to FIG. 5.) Then as a part of the fuzzy inference algorithm, fuzzy logic block 222 "defuzzifies" the generated fuzzy set D2 by pinpointing a particular member of the generated fuzzy set D2. The value of the pinpointed member is the value of weighing factor K1 251.

Figure 3:
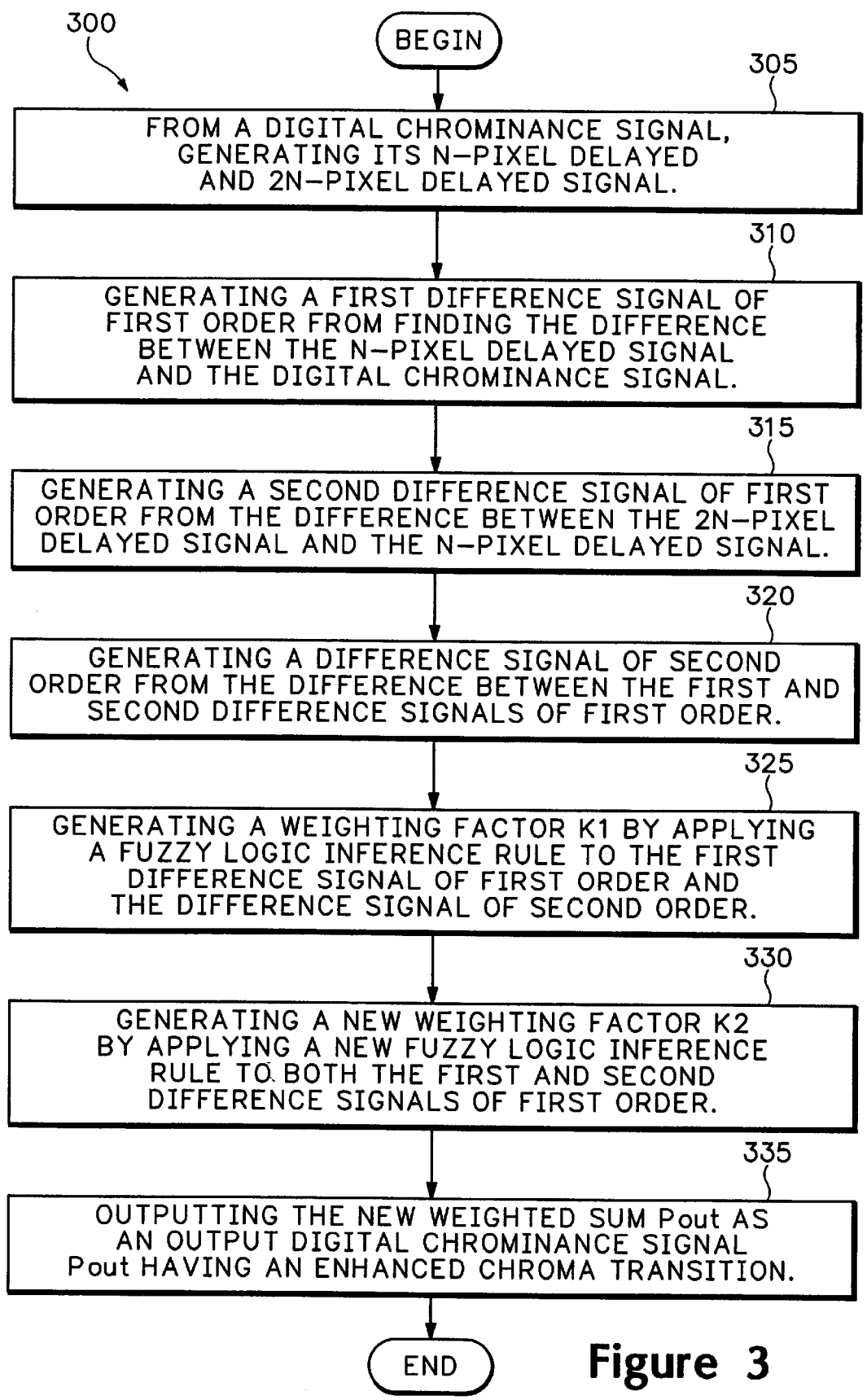
FIG. 3 is a flow chart outlining steps for performing DCTI in accordance with one embodiment of the invention.

Referring now to FIG. 3, a flow chart 300 is shown outlining steps for DCTI in accordance with one embodiment of the invention.

In step 305, upon receiving a digital chrominance signal, its N-pixel delayed and 2N-pixel delayed signals are generated. Specifically, the chroma transition of the N-pixel delayed signal will be undergoing DCTI enhancement.

In step 310, a first difference signal of first order is generated from finding the difference between the N-pixel delayed signal and the digital chrominance signal.

In step 315, a second difference signal of first order is generated from finding the difference between the N-pixel delayed signal and the 2N-pixel delayed signal.

In step 320, a difference signal of second order is generated from the difference between the first and second difference signals of first order.

In step 325, a weighing factor K1 is generated by applying a set of fuzzy logic inference rules to the first difference signal of first order and the difference signal of second order. (This set of fuzzy logic inference rules will be described with reference to FIG. 4.) This weighing factor K1 characterizes a weighted sum Pw of the digital chrominance signal and the 2N-pixel delayed signal. Specifically, Pw is computed using the formula:

Pw=K1 * (digital chrominance signal)+(1−K1) * (the 2N -pixel delayed signal).

The weighing factor K1 has a value in the range of [0,1]. K1 indicates whether the Pw is towards the digital chrominance signal or the 2N-pixel delayed signal. For examples, if the value of K1 is closer to 1 of [0, 1], then the digital chrominance signal plays a more important role (than the 2N-pixel signal) in the weighted sum Pw. If the value of K1 is closer to 0 of [0, 1], then the 2N-pixel delayed signal plays a more important role (than the chrominance signal) in the weighted sum Pw.

Specifically,. as understood herein, the value of weighing factor K1 is generated by implementing a fuzzy inference algorithm in accordance with the set of fuzzy inference rules. More specifically, a fuzzy set D1 is first generated by implementing the fuzzy inference algorithm. Then, the generated fuzzy set D1 is defuzzified, wherein a specific member of the generated fuzzy set D1 is pinpointed. The value indexing this pinpointed member is the value of K1.

In step 330, a new weighing factor K2 is generated by applying a new set of fuzzy logic inference rules to both the first and second difference signals of first order. (This new set of fuzzy logic inference rules will be described with reference to FIG. 5.) This new weighing factor K2 characterizes a new weighted sum of the N-pixel delayed signal and the weighted sum (generated in step 330). Specifically, Pout is computed using the formula:

Pout=K2 * (the N-pixel delayed signal)+(1−K2) * Pw.

The weighing factor K2 has a value in the range of [0, 1]. K2 indicates whether the Pout is towards the N-pixel delayed signal or Pw. For examples, if the value of K2 is closer to 1 of [0, 1], then the N-pixel delayed signal plays a more important role (than Pw) in the new weighted sum Pout. If the value of K2 is closer to 0 of [0, 1], then Pw plays a more important role (than the N-pixel delayed signal) in the new weighted sum Pout.

Specifically, as understood herein, the value of weighing factor K2 is generated by implementing a fuzzy inference algorithm in accordance with the new set of fuzzy inference rules. More specifically, a fuzzy set D2 is first generated by implementing the fuzzy inference algorithm. Then, the generated fuzzy set D2 is defuzzified, wherein a specific member of the generated fuzzy set D2 is pinpointed. The value indexing this pinpointed member is the value of K2.

In step 335, the new weighted sum Pout is outputted as an output digital chrominance signal Pout having an enhanced chroma transition.

Referring now to FIG. 4, a set of 16 fuzzy logic inference rules for performing DCTI in accordance with one embodiment of the invention is summarized as a table 400. This set of fuzzy logic inference rules are implemented for finding the weighing factor K1 described above. (Specifically, in FIG. 2, these 16 fuzzy logic inference rules are implemented by fuzzy logic block 221; in FIG. 3, these fuzzy logic inference rules are implemented in step 325.)

These 16 fuzzy logic inference rules specify the fuzzy logic among three variables. Specifically, these three variables are dP1(I) [the pixel value of the first different signal of first order at the pixel I], dP(I) [the pixel value of the different signal of second order at a pixel I], and K1 [the value of the weighing factor used in characterizing the weighted sum Pw at the pixel I]. More specifically, dP1(I) and dP(I) are related fuzzy logically to K1 in 16 ways according to these 16 fuzzy logic inference rules. dP1(I) has grades of membership in fuzzy sets such as NL (Negative Large), NS (Negative Small), PS (Positive Small) and PL (Positive Large). dP(I) has grades of membership in fuzzy sets such as NL, NS, PS and PL. K1 has grades of membership in fuzzy sets such as Small (S), M (Medium) and L (Large).

For example, entry 411 represents a scenario wherein (at a pixel I) dP1(I) has a fuzzy membership in a fuzzy set of PL and dP(I) has a fuzzy membership in a fuzzy set of NL. Specifically, entry 411 represents a fuzzy inference rule that specifies the fuzzy logic of:

if dP1(I) is PL and if dP(I) is NL, then K1 is L which means that at a pixel I, if the first difference signal of first order falls in a fuzzy membership in fuzzy set of PL, and if the difference signal of second order falls in fuzzy membership of NL, then the weighing factor K1 has a fuzzy membership in fuzzy set of L.

As another example, entry 433 represents a scenarios wherein (at a pixel I) dP1(I) has a fuzzy membership in a fuzzy set of NS and dP(I) has a fuzzy membership in a fuzzy set of PS. Specifically, entry 433 represents a fuzzy inference rule that specifies the fuzzy logic of:

if dP1(I) is NS and if dP(I) is PS, then K1 is M, which means that at a pixel I, if the first difference signal of first order dP1(I) falls in a fuzzy membership in fuzzy set of NS, and if the difference signal of second order dP(I) falls in fuzzy membership of PS, then the weighing factor K1 has a fuzzy membership in fuzzy set of M.

Referring still to FIG. 4, for completeness of description, all 16 fuzzy logic inference rules are listed below in view of entries of table 400.

If dP1(I) is PL and if dP(I) is NL, then K1 is L. (entry 411)
If dP1(I) is PL and if dP(I) is NS, then K1 is L. (entry 412)
If dP1(I) is PL and if dP(I) is PS, then K1 is S. (entry 413)
If dP1(I) is PL and if dP(I) is PL, then K1 is S. (entry 414)
If dP1(I) is PS and if dP(I) is NL, then K1 is L (entry 421)
If dP1(I) is PS and if dP(I) is NS, then K1 is M. (entry 422)
If dP1(I) is PS and if dP(I) is PS, then K1 is M. (entry 423)
If dP1(I) is PS and if dP(I) is PL, then K1 is S. (entry 424)
If dP1(I) is NS and if dP(I) is NL, then K1 is S. (entry 431)
If dP1(I) is NS and if dP(I) is NS, then K1 is M. (entry 432)
If dP1(I) is NS and if dP(I) is PS, then K1 is M. (entry 433)
If dP1(I) is NS and if dP(I) is PL, then K1 is L. (entry 434)
If dP1(I) is NL and if dP(I) is NL, then K1 is S. (entry 441)
If dP1(I) is NL and if dP(I) is NS, then K1 is S. (entry 442)
If dP1(I) is NL and if dP(I) is PS, then K1 is L. (entry 443)
If dP1(I) is NL and if dP(I) is PL, then K1 is L. (entry 444)

Through defuzzification, the weighing factor K1 is given a specific value at the pixel I. In turn, K1 is used to generate the weighted sum Pw at the pixel I:

Pw=K1 * (the digital chrominance signal at the pixel I)+(1-K1) (the 2N-pixel delayed signal at the pixel).

In the present embodiment, a fuzzy logic inference algorithm is implemented to generate K1 from the 16 fuzzy logic inference rules listed above. Specifically, for each fuzzy logic inference rule, a fuzzy subset of the fuzzy set to which K1 belongs (either L, M or S, depending on which fuzzy inference rule) is generated in accordance with the fuzzy logic inference algorithm. As such, 16 fuzzy subsets are generated for K1. Then, these 16 fuzzy subsets are "fuzzy unioned" (unioned according to definitions of fuzzy logic) into a fuzzy set D1 in accordance with the fuzzy logic algorithm. Furthermore, as a part of the fuzzy logic algorithm, the fuzzy set D1 is defuzzified to pinpoint one of its members as K1. The index of K1 is the value of K1 as a weighing factor that characterizes the weighted sum Pw.

Furthermore, in the present embodiment, a center-of-gravity defuzzification is implemented on the fuzzy set D1. However, as understood herein, defuzzification need not be limited to this center-of-gravity defuzzification method. Moreover, as understood herein, the fuzzy membership functions implemented for the fuzzy sets in the present embodiment need not be limited to any particular types. As such, advantageously, the fuzzy membership functions can be modified for fine-tuning the result of performing DCTI.

As understood herein, the membership functions of fuzzy sets NL, NS, PS and PL as related to dP1(I) need not be identical to the membership functions of fuzzy sets NL, NS, PS and PL as related to dP(I).

Figure 5:
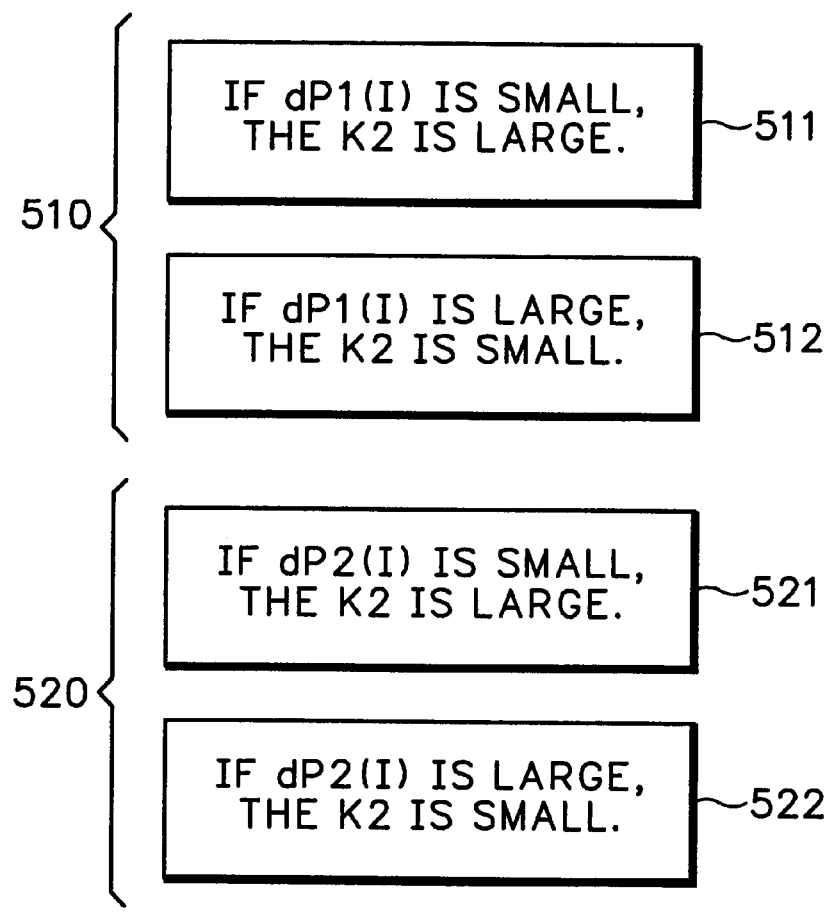
FIG. 5 shows pseudo-codes of another set of fuzzy logic inference rules in pseudo-codes as implemented in accordance with one embodiment of the invention.

Referring now to FIG. 5, a set of four fuzzy logic inference rules (511–512 and 521–522) involved for performing DCTI are shown in pseudo-codes in accordance with one embodiment of the invention. These four fuzzy logic inference rules (511–512 and 521–522) are organized into two groups 510 and 520. Each group has two fuzzy logic inference rules that can be implemented for finding the weighing factor K2 described above. (Specifically, in FIG. 2, these fuzzy logic inference rules are implemented in fuzzy logic block 222; in FIG. 3, these fuzzy logic inference rules are performed in step 335.)

Two of these four fuzzy logic inference rules 511–512 specify the fuzzy logic involving dP1(I) and K2. The other two of these four fuzzy logic inference rules 521–522 specify the fuzzy logic involving dP2(I) and K2. Specifically, dP1(I) refers to the pixel value of the first different signal of first order at the pixel I; dP2(I) refers to the pixel value of the second different signal of first order at a pixel I; and K2 refers to the value of the weighing factor used in characterizing the weighted sum Pout at the pixel I.

More specifically, dP1(I) is related fuzzy logically to K2 in two ways according to fuzzy logic inference rules 511–512; dP2(I) is related fuzzy logically to K2 in two ways according to fuzzy logic inference rules 521–522. dP1(I) has grades of membership in fuzzy sets such as S (Small) and L (Large). dP2(I) has grades of membership in fuzzy sets such as S and L. K2 has grades of membership in fuzzy sets such as S and L.

Referring still to FIG. 5, group 510 includes fuzzy logic inference rules 511–512.

First, fuzzy logic inference rule 511 represent a scenario wherein (at a pixel I) dP1(I) has a fuzzy membership in a fuzzy set of S. Specifically, fuzzy logic inference rule 511 specifies the fuzzy logic of:

if dP1(I) is S, then K2 is L, which means that at pixel I, if the first difference signal of first order falls in a fuzzy membership in fuzzy set of S, then the weighing factor K2 has a fuzzy membership in fuzzy set of L.

Second, fuzzy logic inference rule 512 represent a scenario wherein (at a pixel I) dP1(I) has a fuzzy membership in a fuzzy set of L. Specifically, fuzzy logic inference rule 511 specifies the fuzzy logic of:

if dP1(I) is L, then K2 is S, which means that at pixel I, if the first difference signal of first order falls in a fuzzy membership in fuzzy set of S, then the weighing factor K2 has a fuzzy membership in fuzzy set of L.

Continuing with FIG. 5, group 520 includes fuzzy logic inference rules 521–522.

First, fuzzy logic inference rule 521 represent a scenario wherein (at a pixel I) dP2(I) has a fuzzy membership in a fuzzy set of S. Specifically, fuzzy logic inference rule 521 specifies the fuzzy logic of:

if dP2(I) is S, then K2 is L, which means that at pixel I, if the second difference signal of first order falls in a fuzzy membership in fuzzy set of S, then the weighing factor K2 has a fuzzy membership in fuzzy set of L.

Second, fuzzy logic inference rule 522 represent a scenario wherein (at a pixel I) dP2(I) has a fuzzy membership in a fuzzy set of L. Specifically, fuzzy logic inference rule 521 specifies the fuzzy logic of:

if dP2(I) is L, then K2 is S, which means that at pixel I, if the second difference signal of first order falls in a fuzzy membership in fuzzy set of S, then the weighing factor K2 has a fuzzy membership in fuzzy set of L.

Through defuzzification, the weighing factor K2 is given a specific value at the pixel I. In turn, K2 is used to generate the weighted sum Pout (i.e., the output digital chrominance signal) at the pixel I:

Pout=K2 * (the N-pixel delayed signal at the pixel)+(1−K2) * Pw.

In the present embodiment, a fuzzy logic inference algorithm is implemented to generate K2 from either fuzzy logic inference rules 511–512 or from fuzzy logic inference rules 521–522. Fuzzy logic inference rules 511–512 from group 510 will be used for the purpose of explaining this algorithm. (As understood herein, this fuzzy logic inference algorithm can be implemented for fuzzy logic inference rules 521–522 from group 520 as well.)

Specifically, for each of fuzzy logic inference rules of 511–512, a fuzzy subset of the fuzzy set to which K2 belongs (either S or L, depending on which fuzzy inference rule) is generated in accordance with the fuzzy logic inference algorithm. As such, two fuzzy subsets are generated for K2. Then, these two fuzzy subsets are "fuzzy unioned" (unioned according to definitions of fuzzy logic) into a fuzzy set D2 in accordance with the fuzzy logic algorithm. Furthermore, as a part of the fuzzy logic algorithm, the fuzzy set D2 is defuzzified to pinpoint one of its members as K2. The index of K2 is the value of K2 as a weighing factor that characterizes the weighted sum Pout.

Furthermore, in the present embodiment, a center-of-gravity defuzzification is implemented on the fuzzy set D2. However, as understood herein, defuzzification need not be limited to this center-of-gravity defuzzification method. Moreover, as understood herein, the fuzzy membership functions implemented for the fuzzy sets in the present embodiment need not be limited to any particular types. As such, advantageously, the fuzzy membership functions can be modified for fine-tuning the result of performing DCTI.

As understood herein, the membership functions of fuzzy sets S and L as related to dP1(I) need not be identical to the membership functions of fuzzy sets S and L as related to dP2(I). Also, as understood herein, the membership functions of fuzzy sets S and L as related to K1 (discussed with reference to FIG. 4) need not be identical to the membership functions of fuzzy sets S and L as related to K2.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A computer implemented method stored on a recordable media for performing digital color transition improvement (DCTI) on a N-pixel delayed signal of a digital chrominance signal, said method comprising.

using said digital chrominance signal, said N-pixel delayed signal and a 2N-pixel delayed signal of said digital chrominance signal, generating a first and second difference signals of first order;

using said first and second difference signals of first order, generating a difference signal of second order; and generating a first weighted sum of the digital chrominance signal, the 2N-pixel delayed signal and a first weight factor determined by applying a first set of fuzzy logic inference rules to the first difference signal of first order and the difference signal of second order.

2. The method of claim 1, comprising:
generating a second weighted sum of the first weighted sum, the N-pixel delayed signal and a second weight factor determined by applying a second set of fuzzy logic inference rules to the second difference signal of first order and the first difference signal of first order, wherein said second weighted sum has an enhanced digital color transition in comparison to the digital chrominance signal.

3. The method of claim 2, wherein the second weighted sum is characterized as:
(the second factor) * (the N-pixel delayed signal)+(1− the second weight factor) * (the first weighted sum).

4. The method of claim 2, comprising:
generating the second weight factor by performing a second fuzzy logic inference algorithm to implement the second set of fuzzy logic inference rules.

5. The method of claim 4, wherein the second fuzzy logic inference algorithm comprises:
defining a plurality of second fuzzy subsets, a second fuzzy subset being associated with each fuzzy logic inference rule of the second set of fuzzy logic inference rules;
forming a second fuzzy union set of the plurality of second fuzzy subsets; and
defuzzifying the second fuzzy union set by using a center of gravity defuzzification method to generate the second weight factor.

6. The method of claim 2, wherein the second set of fuzzy logic inference rules comprises:
b1)dP1(I) being a pixel value at a pixel I for the first difference signal of first order;
b2)dP2(I) being a pixel value at the pixel I for the second difference signal of first order; and
b3)K2 being the second weight factor;
wherein for the second set of fuzzy logic inference rules, the first difference signal of first order has grades of fuzzy set membership in fuzzy sets including Small (S) and Large (L);
wherein for the second set of fuzzy logic inference rules, the second difference signal of first order has grades of fuzzy set membership in fuzzy sets S and L; and
wherein for the second set of fuzzy logic inference rules, the second weight factor has grades of membership in fuzzy sets S and L.

7. The method of claim 6, wherein the second set of fuzzy logic inference rules comprises:
if dP1(I) is S, then K2 is L;
if dP1(I) is L, then K2 is S;
if dP2(I) is S, then K2 is L; and
if dP2(I) is L, then K2 is S.

8. The method of claim 1, wherein the first weighted sum at a pixel is characterized as:
(the first weight factor) * (the digital chrominance signal)+(1−the first weight factor) * (the 2N-pixel delayed signal).

9. The method of claim 1, comprising:
generating the first weight factor by performing a first fuzzy logic inference algorithm to implement the first set of fuzzy logic inference rules.

10. The method of claim 9, wherein the first fuzzy logic inference algorithm comprises:
defining a plurality of first fuzzy subsets, a first fuzzy subset being associated with each fuzzy logic inference rule of the first set of fuzzy logic inference rules;
forming a first fuzzy union set of the plurality of first fuzzy subsets; and
defuzzifying the first fuzzy union set by using a center of gravity defuzzification method to generate the first weight factor.

11. The method of claim 1, wherein the first set of fuzzy logic inference rules comprises:
a1)dP1(I) being a pixel value at a pixel I for the first difference signal of first order;
a2)dP(I) being a pixel value at the pixel I for the difference signal of second order; and
a3)K1 being the first weight factor;
wherein for the first set of fuzzy logic inference rules, the first difference signal of first order has grades of fuzzy set membership in fuzzy sets including Negative Large (NL), Negative Small (NS), Positive Small (PS) and Positive Large (PL);
wherein for the first set of fuzzy logic inference rules, the difference signal of second order has grades of fuzzy membership in fuzzy sets NL, NS, PS and PL; and
wherein for the first set of fuzzy logic inference rules, the first weight factor has grades of fuzzy set membership in fuzzy sets Small (S) and Large (L).

12. The method of claim 11, wherein the first set of fuzzy logic inference rules comprises:
if dP1(I) is PL and if dP(I) is NL, then K1 is L;
if dP1(I) is PL and dP(I) is NS, then K1 is L;
if dP1(I) is PL and dP(I) is PS, then K1 is S;
if dP1(I) is PL and dP(I) is PL, then K1 is S;
if dP1(I) is PS and dP(I) is NL, then K1 is L;
if dP1(I) is PS and dP(I) is NS, then K1 is M;
if dP1(I) is PS and dP(I) is PS, then K1 is M;
if dP1(I) is PS and dP(I) is PL, then K1 is S;
if dP1(I) is NS and dP(I) is NL, then K1 is S;
if dP1(I) is NS and dP(I) is NS, then K1 is M;
if dP1(I) is NS and dP(I) is P, then K1 is M;
if dP1(I) is NS and dP(I) is PL, then K1 is L;
if dP1(I) is NL and dP(I) is NL, then K1 is S;
if dP1(I) is NL and dP(I) is NS, then K1 is S;
if dP1(I) is NL and dP(I) is PS, then K1 is L; and
if dP1(I) is NL and dP(I) is PL, then K1 is L.

13. A system of digital color transition improvement (DCTI) for a N-pixel delayed signal of a digital chrominance signal, the system comprising:
a first summing component for generating a first difference signal of first order using the digital chrominance signal and the N-pixel delayed signal;
a second summing component for generating a second difference signal of first order using the N-pixel delayed signal and a 2N-pixel delayed signal of the digital chrominance signal;
a third summing component for generating a difference signal of second order using the first and second difference signals of first order; and
a first calculation circuit block for calculating a first weighted sum of the digital chrominance signal and the 2N-pixel delayed signal, the fuzzy-logic circuit block being adapted to determine a first weight factor to characterize the first weighted sum by applying a first set of fuzzy logic inference rules to the first difference signal of first order and the difference signal of second order.

14. The system of claim 13, comprising:
a second calculation circuit block calculating a second weighted sum of the N-pixel delayed signal and the first weighted sum, the second weighted sum further characterized by a the second weight factor determined by applying a second set of fuzzy logic inference rules to the first and second difference signal of first order.

15. The system of claim 14, wherein the second weighted sum is characterized by:
(the second weight factor) * (the N-pixel delayed signal)+ (1−the second weight factor) * (the first weighted sum).

16. The system of claim 14, wherein the second fuzzy logic circuit block is adapted to generate the second weight factor by performing a second fuzzy logic inference algorithm that implements the second set of fuzzy logic inference rules.

17. The system of claim 16, wherein the second fuzzy logic inference algorithm is adapted to:
define a plurality of second fuzzy subsets, a second fuzzy subset being associated with each fuzzy logic inference rule of the second set of fuzzy logic inference rules;
form a second fuzzy union set of the plurality of second fuzzy subsets; and
defuzzify the second fuzzy union set by using a center of gravity defuzzification method to generate the second weight factor.

18. The system of claim 14, wherein the second set of fuzzy logic inference rules comprise:
b1) dP1(I) being a pixel value at a pixel I for the first difference signal of first order;
b2) dP2(I) being a pixel value at the pixel I for the difference signal of second order; and
b3) K2 being the second weight factor;
wherein for the second set of fuzzy logic inference rules, the first difference signal of first order has grades of fuzzy set membership in fuzzy sets Small (S) and Large (L);
wherein for the second set of fuzzy logic inference rules, the second difference signal of first order has grades of fuzzy membership in fuzzy sets S and L; and
wherein for the second set of fuzzy logic inference rules, the second weight factor has grades of membership in fuzzy sets S and L.

19. The system of claim 18, wherein the second set of fuzzy logic inference rules comprise:
if dP1(I) is S, then K2 is L;
if dP1(I) is L, then K2 is S;
if dP2(I) is S, then K2 is L; and
if dP2(I) is L, then K2 is S.

20. The system of claim 13, wherein the first weighted sum is characterized by:
(the first factor) * (the digital chrominance signal)+(1−the first weight factor) * (the 2N-pixel delayed signal).

21. The system of claim 13, wherein the first fuzzy logic circuit block is adapted to generate the first weight factor by performing a first fuzzy logic inference algorithm that implements the first set of fuzzy logic inference rules.

22. The system of claim 21, wherein the first fuzzy logic inference algorithm is adapted to:
define a plurality of first fuzzy subsets, a first fuzzy subset being associated with each fuzzy logic inference rule of the first set of fuzzy logic inference rules;
form a first fuzzy union set of the plurality of first fuzzy subsets; and
defuzzify the first fuzzy union set by using a center of gravity defuzzification method to generate the first weight factor.

23. The system of claim 13, wherein the first set of fuzzy logic rules comprise:
a1) dP1(I) being a pixel value at a pixel I for the first difference signal of first order;
a2) dP(I) being a pixel value at pixel I for the difference signal of second order; and
a3) K1 being the first weight factor;
wherein for the first set of fuzzy logic inference rules, the first difference signal of first order has grades of fuzzy set membership in fuzzy sets including Negative Large (NL), Negative Small (NS), Positive Small (PS) and Positive Large (PL);
wherein for the first set of fuzzy logic inference rules, the difference signal of second order has grades of fuzzy membership in fuzzy sets NL, NS, PS and PL; and
wherein for the first set of fuzzy logic inference rules, the first weight factor has grades of fuzzy set membership in fuzzy sets Small (S) and Large (L).

24. The system of claim 23, wherein the first set of fuzzy logic inference rules comprise:
if dP1(I) is PL and if dP(I) is NL, then K1 is L;
if dP1(I) is PL and dP(I) is NS, then K1 is L;
if dP1(I) is PL and dP(I) is PS, then K1 is S;
if dP1(I) is PL and dP(I) is PL, then K1 is S;
if dP1(I) is PS and dP(I) is NL, then K1 is L;
if dP1(I) is PS and dP(I) is NS, then K1 is M;
if dP1(I) is PS and dP(I) is PS, then K1 is M;
if dP1(I) is PS and dP(I) is PL, then K1 is S;
if dP1(I) is NS and dP(I) is NL, then K1 is S;
if dP1(I) is NS and dP(I) is NS, then K1 is M;
if dP1(I) is NS and dP(I) is P, then K1 is M;
if dP1(I) is NS and dP(I) is PL, then K1 is L;
if dP1(I) is NL and dP(I) is NL, then K1 is S;
if dP1(I) is NL and dP(I) is NS, then K1 is S;
if dP1(I) is NL and dP(I) is PS, then K1 is L; and
if dP1(I) is NL and dP(I) is PL, then K1 is L.

25. A computer implemented method stored on a recordable media for improving color transition of a digital signal, comprising:
delaying the digital signal by N pixels to generate an N-pixel delayed signal;
delaying the N-pixel delayed signal by N pixels to generate a 2N-pixel delayed signal;
taking a difference of the digital signal and the N-pixel delayed signal to generate a first difference signal;
taking a difference of the N-delayed signal and the 2N-pixel delayed signal to generate a second difference signal;
taking a difference of the first and second difference signals to generate a second order difference signal;
generating a first weighted sum of the digital signal, the N-pixel delayed signal and a first weight factor, the first weight factor resulting from application of a first set of fuzzy logic inference rules; and
generating a second weighted sum of the first weighted sum, the N-pixel delayed signal and a second weight factor, the second weight factor resulting from application of a second set of fuzzy logic inference rules.

26. The method of claim 25 comprising:
generating the first weight factor by applying the first set of fuzzy logic inference rules to the second order difference signal and the first difference signal.

27. The method of claim 25 comprising:
generating the second weight factor by applying the second set of fuzzy logic inference rules to the first and second difference signals.

28. The method of claim 25 comprising:
defining a plurality of first fuzzy subsets, a first fuzzy subset corresponding to a fuzzy logic inference rule of the first set of fuzzy logic inference rules;

forming a first fuzzy union set of the plurality of first fuzzy subsets; and defuzzifying the first fuzzy union set by using a center of gravity defuzzification method to generate the first weight factor.

29. The method of claim 28
wherein dP1(I) is a pixel value at a pixel I for the first difference signal;

wherein dP(I) is a pixel value at the pixel I for the second difference signal;

wherein K1 is the first weight factor;

wherein for the first set of fuzzy logic inference rules, the first difference signal has grades of fuzzy set membership in fuzzy sets including Negative Large (NL), Negative Small (NS), Positive Small (PS) and Positive Large (PL);

wherein for the first set of fuzzy logic inference rules, the second order difference signal has grades of fuzzy membership in fuzzy sets NL, NS, PS and PL; and wherein for the first set of fuzzy logic inference rules, the first weight factor has grades of fuzzy set membership in fuzzy sets Small (S) and Large (L).

30. The method of claim 29 wherein the first set of fuzzy logic inference rules comprises:

if dP1(I) is PL and if dP(I) is NL, then K1 is L;
if dP1(I) is PL and dP(I) is NS, then K1 is L;
if dP1(I) is PL and dP(I) is PS, then K1 is S;
if dP1(I) is PL and dP(I) is PL, then K1 is S;
if dP1(I) is PS and dP(I) is NL, then K1 is L;
if dP1(I) is PS and dP(I) is NS, then K1 is M;
if dP1(I) is PS and dP(I) is PS, then K1 is M;
if dP1(I) is PS and dP(I) is PL, then K1 is S;
if dP1(I) is NS and dP(I) is NL, then K1 is S;
if dP1(I) is NS and dP(I) is NS, then K1 is M;
if dP1(I) is NS and dP(I) is P, then K1 is M;
if dP1(I) is NS and dP(I) is PL, then K1 is L;
if dP1(I) is NL and dP(I) is NL, then K1 is S;
if dP1(I) is NL and dP(I) is NS, then K1 is S;
if dP1(I) is NL and dP(I) is PS, then K1 is L; and
if dP1(I) is NL and dP(I) is PL, then K1 is L.

31. The method of claim 25 comprising:
defining a plurality of second fuzzy subsets, a second fuzzy subset corresponding to a fuzzy logic inference rule of the second set of fuzzy logic inference rules;

forming a second fuzzy union set of the plurality of second fuzzy subsets; and defuzzifying the second fuzzy union set by using a center of gravity defuzzification method to generate the second weight factor.

32. The method of claim 31
wherein dP1(I) is a pixel value at a pixel I for the first difference signal;

wherein dP2(I) is a pixel value at the pixel I for the second difference signal;

wherein K2 is the second weight factor;

wherein for the second set of fuzzy logic inference rules, the first difference signal has grades of fuzzy set membership in fuzzy sets including Small (S) and Large (L);

wherein for the second set of fuzzy logic inference rules, the second difference signal has grades of fuzzy set membership in fuzzy sets S and L; and wherein for the second set of fuzzy logic inference rules, the second weight factor has grades of membership in fuzzy sets S and L.

33. The method of claim 32 wherein the second set of fuzzy logic inference rules comprises:
if dP1(I) is S, then K2 is L;
if dP1(I) is L, then K2 is S;
if dP2(I) is S, then K2 is L; and
if dP2(I) is L, then K2 is S.

* * * * *